United States Patent [19]
Hsin-Yung

[11] Patent Number: 5,836,563
[45] Date of Patent: Nov. 17, 1998

[54] MOBILE PHONE HOLDER

[76] Inventor: Tao Hsin-Yung, 5Fl,No. 2, JienKang Rd., ChunghHo City, Taipei Hsien, Taiwan

[21] Appl. No.: 928,700

[22] Filed: Sep. 12, 1997

[51] Int. Cl.$^6$ ........................................................ A47G 1/10
[52] U.S. Cl. ........................ 248/316.4; 379/455; 379/454; 379/426
[58] Field of Search ..................... 379/455, 454, 379/456, 449, 426, 428; 455/90, 351; 248/316.4, 316.1, 231.41

[56] References Cited

U.S. PATENT DOCUMENTS

| | | | |
|---|---|---|---|
| 5,305,381 | 4/1994 | Wang et al. | 379/455 |
| 5,457,745 | 10/1995 | Wang | 379/454 |
| 5,555,302 | 9/1996 | Wang | 379/446 |
| 5,694,468 | 12/1997 | Hsu | 379/446 |

Primary Examiner—Ramon O. Ramirez
Attorney, Agent, or Firm—W. Wayne Liauh

[57] ABSTRACT

A mobile phone holder is disclosed which can be opened or closed by a single push of one hand. The mobile phone thus may be fetched readily or be placed therein handily without distracting too much of a driver's attention and is much safer to use. It include s mainly a frame, a cover, a clamp, an elastic member, a gear, a push button, a toggle member and a spring. When the toggle member is pushed, the clamp will hold the phone securely in the frame. The toggle member is pivotally moveable in the opening of the frame. The spring is provided for moving the toggle slantly outside the opening of the frame when external force is absent. When the push button is pressed, the clamp will be moved outwardly to free the phone for fetching and use. All of this m ay be done singlehanded easily. It thus greatly enhances the driving safety when using in a car.

2 Claims, 5 Drawing Sheets

MOBILE PHONE HOLDER

BACKGROUND OF THE INVENTION

1. Field of the Invention

This invention relates to a mobile phone holder and particularly to a mobile phone holder which can automatically hold a mobile phone securely when the phone is placed upon it.

2. Description of the Prior art

Mobile phones such as cellular phones are very popular nowadays. They are also being widely used in cars for drivers to make phone call whenever they need and wherever they go. In order to enable a driver to fetch the phone readily, there is a mobile phone holder being marketed for installing near the driver's seat. U.S. Pat. No. 5,305,381 discloses one of such devices. It includes mainly (referring to FIG. 1) a base A, a bar B integrated with a lever I, compression springs C, a left clamp D, a first gear E, a right clamp F, a second gear G and a cover H. Upon pressing the bar B, the lever I will disengage with the second gear G, the left clamp D and the right clamp F will be pushed apart because of the springs C. Then the mobile phone may be placed therein or removed therefrom. When pressing the clamps D and F against each other, a gear rack disposed thereon engages with the first gear E and making the clamps D and F moving toward each other, and the springs C will be compressed until the lever I engages with the second gear G. Then the mobile phone will be held tightly between the clamps D and F.

The structure set forth above in the prior art is complex and has many components. It is expensive to produce, difficult to assemble and is prone to malfunction. It is also cumbersome to use. As the user has to use two or three fingers to press the clamps D and F while use the remaining two or three fingers of same hand to grab the phone. The phone could easily get loose or slip away. While the phone may get damage from falling off, the driver could be distracted from driving and get into accidents.

SUMMARY OF THE INVENTION

In view of aforesaid disadvantages, it is therefore an object of this invention to provide a mobile phone holder which may be opened or closed by a single push of one hand. The mobile phone thus may be fetched readily or be placed therein handily without distracting too much of a driver's attention. It is much safer to use.

It is another object of this to provide a mobile phone holder which may include an oil press gear for clamping a mobile phone more smoothly.

It is a further object of this invention to provide a mobile phone which is simple in structure and less costly to produce.

The mobile phone holder according to this invention including mainly a frame, a cover, a clamp, an elastic member, a gear, a push button, a toggle member and a spring. Upon pushing the toggle member by means of the mobile phone, the clamp may hold the phone securely in the frame. Upon pressing the push button, the clamp will be moved outwardly to free the phone for fetching and use. All of this may be done singlehanded easily. It thus greatly enhances the driving safety when using in a car.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

Figure 1:
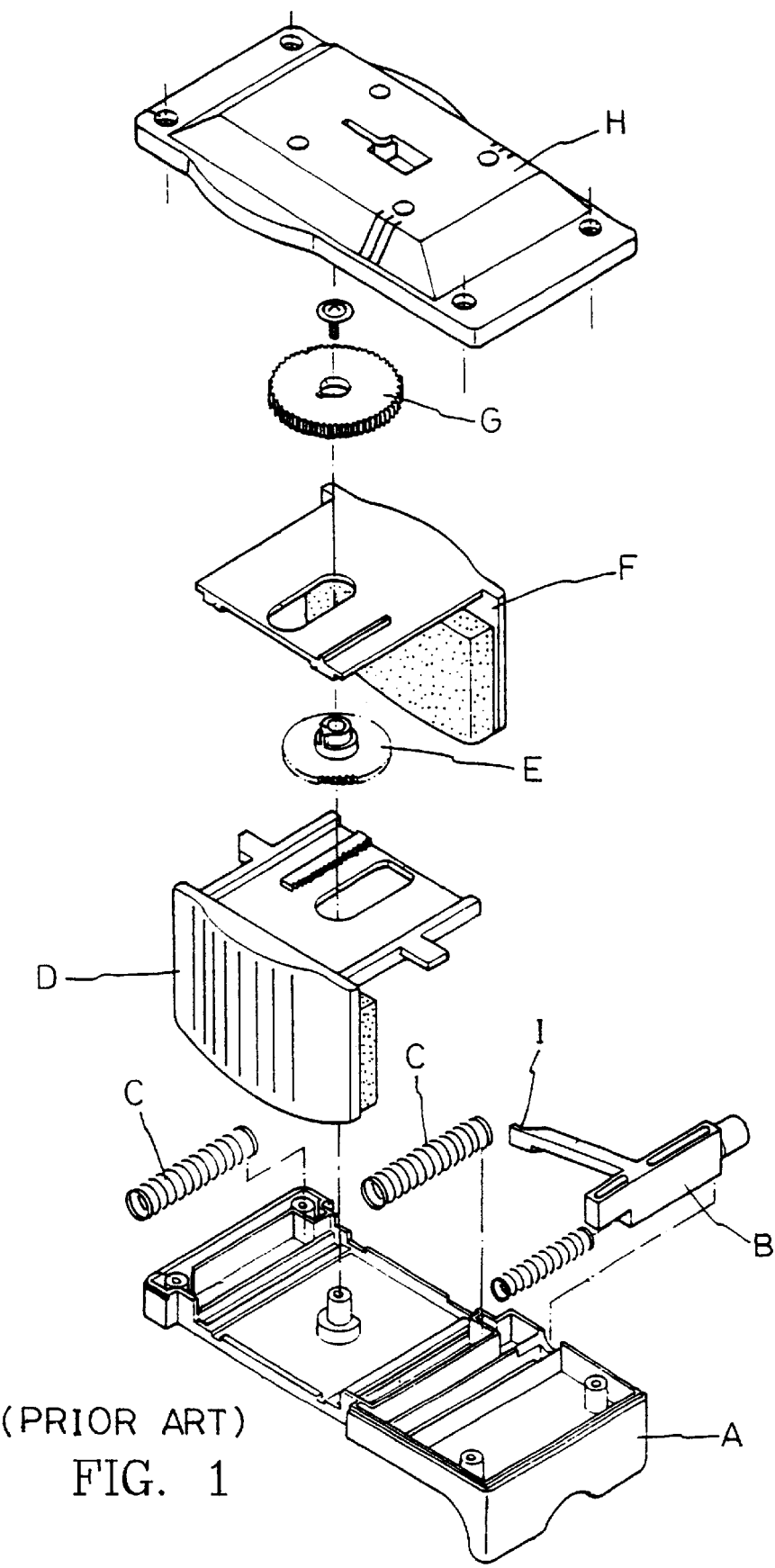
FIG. 1 an exploded view of a conventional mobile phone holder.
Figure 2:
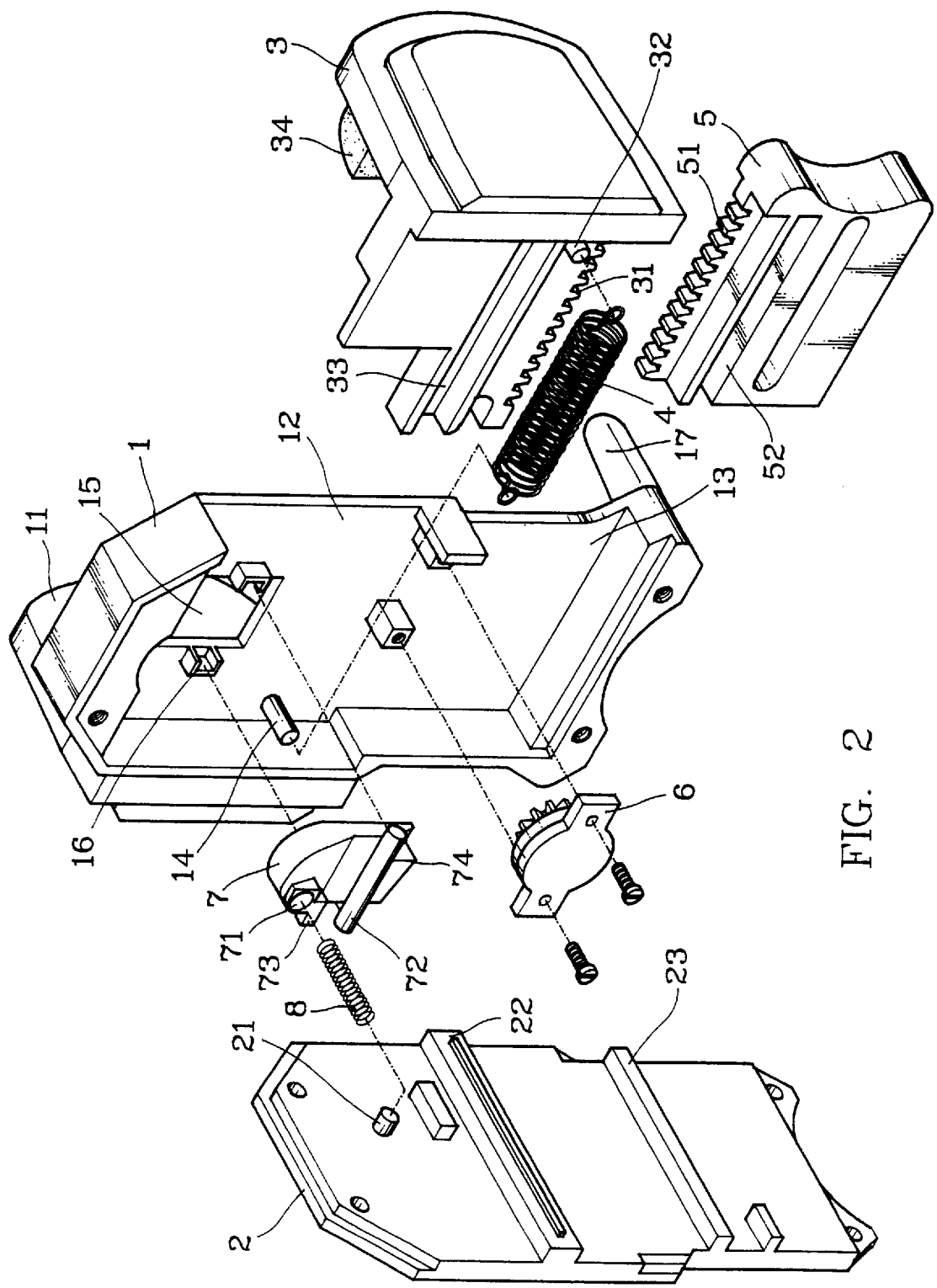
FIG. 2 is an exploded view of this invention.
Figure 3:
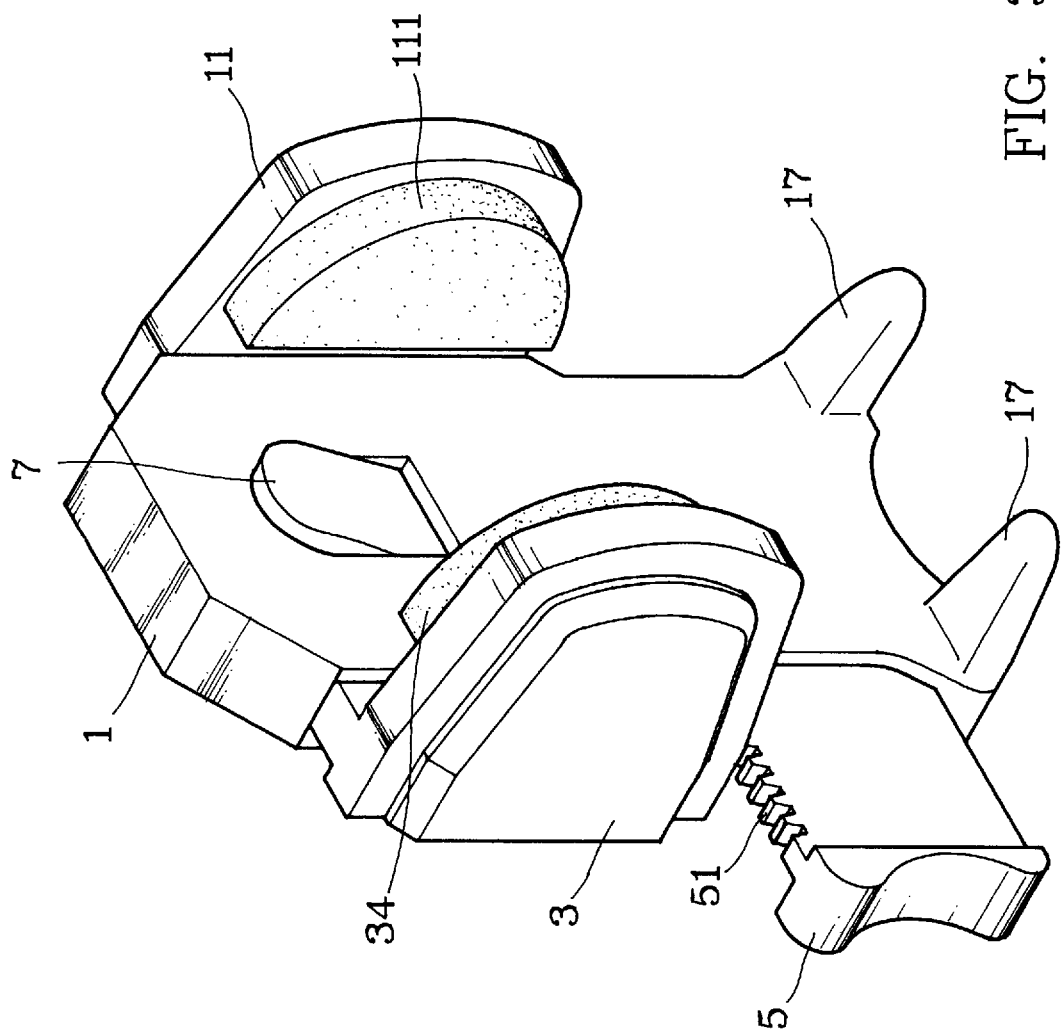
FIG. 3 is a perspective view of this invention.

Referring to FIGS. 2 and 3, the mobile phone of this invention includes a frame 1, a cover 2, a clamp 3, an elastic member 4, a push button 5, a gear 6 and a toggle member 7. The frame I has a clamp arm 11 one side and two slots 12 and 13 formed on another side. On a lateral side of the clamp arm 11, there is provided with a first soft padding 111. On a rear surface near the clamp arm 11, there is a first stud 14. In an upper portion of the frame 1, there is an opening 15. Adjacent two lateral sides of the opening 15, there are a pair of pivot seats 16. At the bottom edge of the frame 11 is a pair of spaced feet 17.

In the cover 2, there is a second stud 21 at an upper portion and two spaced and horizontal rails 22 and 23 in the middle and lower portions.

The clamp 3 is slidable in the slot 12. It has a first gear rack 31 at the bottom edge, a third stud 32 on one side, a second soft padding 34 on a lateral edge and a first horizontal groove 33 on a rear side for engaging with the rail 22.

The elastic member, preferably a spring, engages at both ends with the first stud 14 and the third stud 32.

The push button 5 is slidable in the slot 13 and has a second gear rack 51 on a top edge and a rear second horizontal groove 52 for engaging with the rail 23.

The gear 6 is fastened to the inside wall of the frame I between the slots 12 and 13 and is engageable on two opposite sides with the first and second gear racks 31 and 51 respectively.

The toggle member 7 pivotally moveable in the opening 15 includes a rear recess 71 adjacent a sideward projection 73, a horizontal shaft 72 engageable at two ends with the pivot seats 16, and a protrusive block 74, located below the horizontal shaft 72. A spring 8 engages at two ends respectively with the recess 71 and the second stud 21 for pushing the top end of toggle member outward through the opening 15 when external force is absent (as shown in FIG. 3). In the final assembly, the toggle member 7 and the spring 8 are put in place, the gear 6 is installed, the clamp 3 is set in the slot 12, the push button 5 is set in the slot 13, the elastic member 4, is put in place, then the cover 2 is fastened to the frame 1 to complete the whole device.

Figure 4:
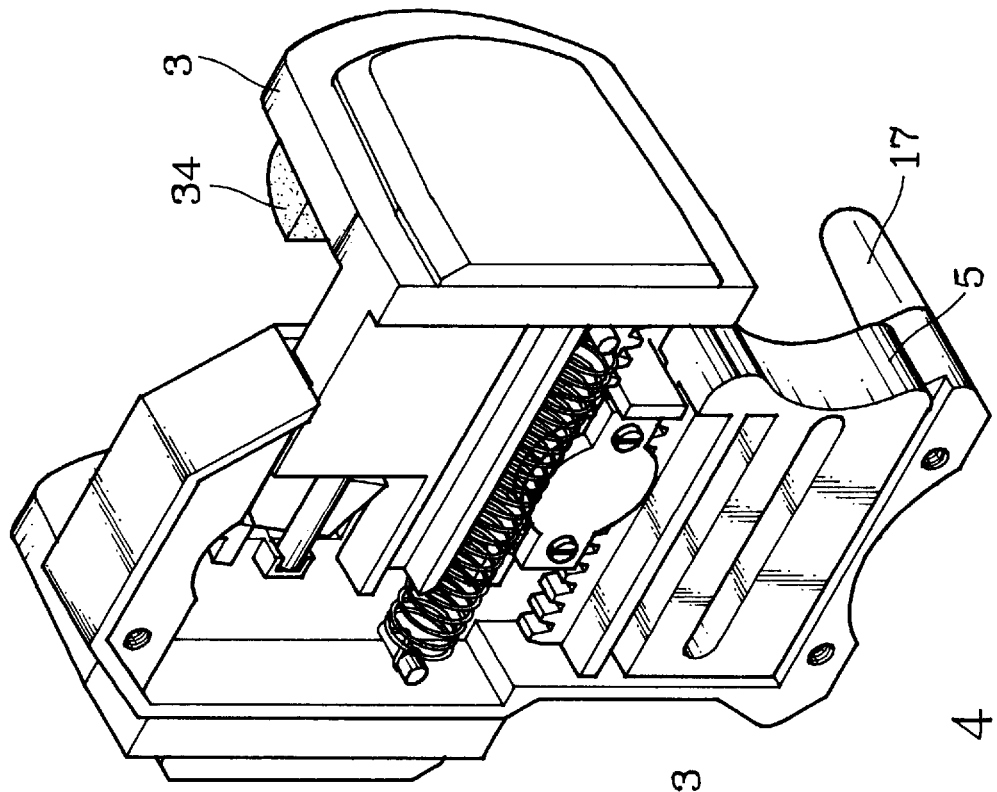
FIG. 4 is a pictorial view of this invention in use, for releasing a mobile phone.

Referring to FIG. 4 for this invention at an open state which enables the mobile phone held therein be readily fetched out. The push button 5 is pressed and moved in the frame 1, the gear 6 driven by the second gear rack 51 drives the first gear rack 31 in outward direction and making the clamp 3 extending outside of the frame 1. The mobile phone is thus ready to be taken out singlehandedly. At this position, the top end of the toggle member 7 is tilted outward through the opening 15 because of the pushing force of the spring 8. The block 74 of the toggle member 7 is tilted in rear ward direction and stops a lateral side of the clamp 3. Thus the clamp 3 is prevented from moving into the frame 1.

Figure 5:
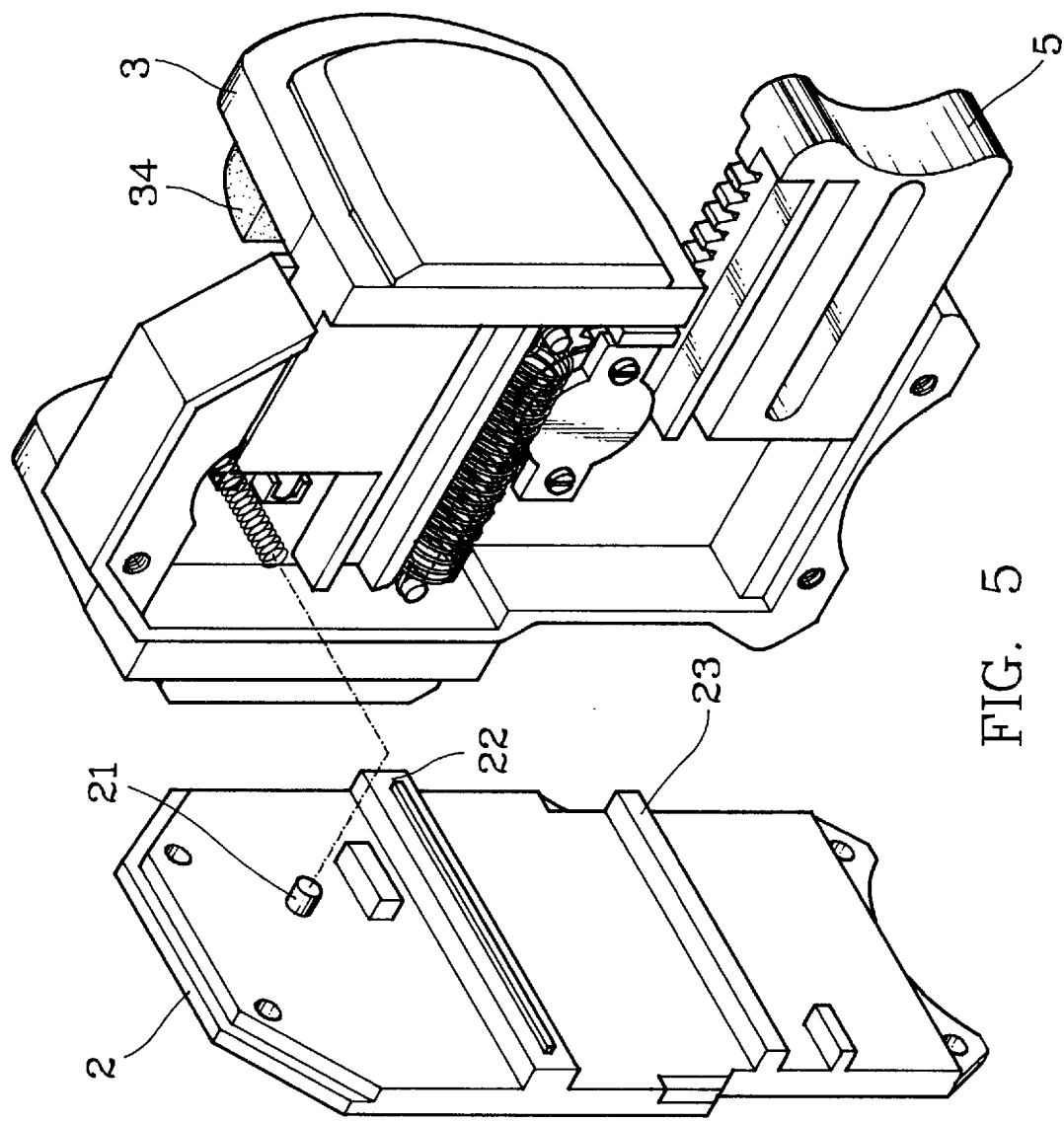
FIG. 5 is a pictorial view of this invention in use, for securing a mobile phone.

Referring to FIG. 5, when placing the mobile phone in the frame 1 above the feet 17 and pushing the tilted toggle member 7 to an upright position, the block 74 of the toggle member 7 disengages with the clamp 3. Because of the pulling force of the elastic member 4, the clamp 3 will be moved into the frame 1 to held the mobile phone tightly while the push button 5 will be driven outward by the gear 6. All of above operations may be done singlehandedly and easily without taxing too much attention of a user. The rails 22 and 23, engaging respectively with the grooves 33 and 52, can further smooth the operation and movement of this invention.

It may thus be seen that the objects of the present invention set forth herein, as well as those made apparent from the foregoing description, are efficiently attained. While the preferred embodiment of the invention has been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention

What is claimed is:

1. A mobile phone holder, comprising:

a frame having a clamp arm on a lateral side, two slots on another lateral side, two spaced feet at a bottom end and an opening at an upper portion; adjacent two lateral sides of the opening in the rear surface of the frame is two spaced pivot seats, nearby the clamp arm in the rear surface of the frame having a first stud;

a cover fastenable with the frame having a second stud located thereon;

a clamp slidable in the first slot having a first gear rack on a bottom edge thereof and a third stud in a rear surface thereof, an elastic member engageable respectively at two ends with the first and the third studs;

a push button slidable in the second slot having a second gear rack on a top edge;

a gear located in the middle of rear surface of the frame between the two slots engageable respectively at a top with the first gear rack and at a bottom with the second gear rack;

a toggle member pivotally moveable in the opening of the frame having a rear recess adjacent a sideward projection, a horizontal shaft engageable with the pivot seats and a protrusive block at a bottom below the shaft; and a spring engageable at two ends with the recess and the second stud for moving the toggle slantly outside the opening of the frame when external force is absent.

2. A mobile phone holder of claim 1, wherein the clamp and push button have respectively a groove in a rear side engageable respectively with two rails formed in the front surface of the cover.

* * * * *